United States Patent Office 3,641,161
Patented Feb. 8, 1972

3,641,161
NAPHTHYL ALKANOLS
John H. Fried and Ian T. Harrison, Palo Alto, Calif.,
assignors to Syntex Corporation, Panama, Panama
No Drawing. Filed July 2, 1968, Ser. No. 741,904
Int. Cl. C07c 43/20
U.S. Cl. 260—613 D                                   15 Claims

ABSTRACT OF THE DISCLOSURE

β-[2-naphthyl] ethanols optionally substituted at the β-position and/or position C–1, 4, 5, 7 or 8; and/or position C–6 possess anti-inflammatory, analgesic, anti-pyretic and anti-pruritic activity.

---

This invention pertains to novel naphthyl alkanols and derivatives thereof; to methods of using thereof; and to processes for the preparation thereof.

More particularly, the present novel invention is directed to β-[2-naphthyl] ethanols and derivatives thereof which exhibit anti-inflammatory, analgesic, anti-pyretic and anti-pruritic activity.

The present β-[2-naphthyl] ethanols and derivatives thereof can be illustrated by the following formulas:

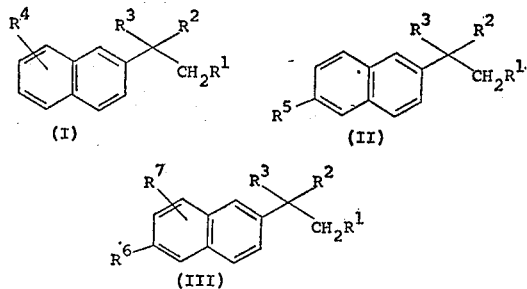

wherein, $R^1$ is hydroxy, conventional hydrolyzable ester, tetrahydrofuran-2′-yloxy, tetrahydropyran-2′-yloxy or 4′-alkoxytetrahydropyran-4′-yloxy;

One of $R^2$ and $R^3$ is hydrogen, the other is hydrogen, methyl, ethyl or difluoromethyl; or $R^2$ and $R^3$ taken together are methylene, halomethylene or ethylene;

$R^4$ (at position C–1, 4, 5, 7 or 8) is hydrogen, alkyl, trifluoromethyl, fluoro, chloro, hydroxy, a conventional hydrolyzable ester, oxyether or thioether;

$R^5$ is alkyl, cycloalkyl, hydroxymethyl, alkoxymethyl, trifluoromethyl, vinyl, ethynyl, fluoro, chloro, hydroxy, a conventional hydrolyzable ester, oxyether, thioether, formyl, acetyl or aryl; and Each of $R^6$ and $R^7$ (at position C–1, 4, 5, 7 or 8) is alkyl, fluoro, chloro, hydroxy, a conventional hydrolyzable ester, oxyether, or thioether; provided that when one of $R^6$ and $R^7$ is hydroxy, oxyether or thioether, the other is the identical group or alkyl, fluoro, chloro or a conventional hydrolyzable ester.

An especially preferred group of compounds of Formulas I, II or III for use in the present method of treating inflammation, pain, pyrecia and pruritus include β-[2-naphthyl] ethanol, β-[2-naphthyl]-β-methylethanol, β-[2-naphthyl]-β-difluoromethylethanol, β - [2-naphthyl]-β,β-methyleneethanol, β-[2-naphthyl]-β,β-difluoromethyleneethanol and the C–5, 6- or 7-methyl, -fluoro, -chloro, -trifluoromethyl, -methoxy and -methylthio derivatives thereof.

By the terms which define an "alkyl" grouping are meant lower molecular weight, branched or straight chain hydrocarbon groups of six or less carbon atoms, such as methyl, ethyl, propyl, isopropyl, butyl, tertiarybutyl, pentyl, hexyl, and the like. By the term "cycloalkyl" is meant cyclic hydrocarbon groups of three to seven carbon atoms, such as cyclopropyl, cyclopentyl, cyclohexyl, and the like.

By the term "alkoxy" is intended a straight or branched chain hydrocarbon ether group of six or less carbon atoms, including methoxy, ethoxy, 2-propoxy, propoxy, butoxy, 3-pentoxy, and the like. By the terms which define an "alkoxymethyloxy" grouping are meant methylether groups substituted with one alkoxy group; typical alkoxymethyloxy groups include methoxymethyloxy, ethoxymethyloxy, isopropoxymethyloxy, and the like. By the term "alkylthio" is intended straight or branched chain hydrocarbon thioether groups of six or less carbon atoms, including methylthio, ethylthio, propylthio, 2-propylthio, 2-butylthio, pentylthio, 3-hexylthio, and the like. By the term "alkoxymethylthio" is meant methylthio ether groups substituted with one alkoxy group, such as methoxymethylthio, ethoxymethylthio, 2-propoxymethylthio, and the like.

By the term "aryl" is intended unsubstituted and p-substituted phenyl derivatives, such as phenyl, p-tolyl, p-fluorophenyl, p-chlorophenyl, p-hydroxyphenyl, p-methoxyphenyl, p-ethylphenyl, and the like.

By the term "halomethylene" is meant mono- or dihalomethylene groups wherein halo is fluoro or chloro. The preferred halomethylenes include fluoromethylene, difluoromethylene, fluorochloromethylene, and chloromethylene.

The term "conventional hydrolyzable ester," as used herein, denotes those hydrolyzable ester groups conventionally employed in the art, preferably those derived from hydrocarbon carboxylic acids or their salts. The term "hydrocarbon carboxylic acid" defines both substituted and unsubstituted hydrocarbon carboxylic acids. These acids can be completely saturated or possess varying degrees of unsaturation (including aromatic), can be of straight chain, branched chain, or cyclic structure and preferably contain from one to twelve carbon atoms. Typical conventional hydrolyzable esters thus included within the scope of the term and the instant invention are acetate, propionate, 2-methyl propionate, butyrate, valerate, caproate, enanthate, caprylate, benzoate, phenylacetate, diethylacetate, trimethylacetate, t-butylacetate, cyclohexylacetate, cyclopentylpropionate, admantoate, bicyclo[2.2.2]octyl carboxylate, hemisuccinate, hemiadipate, hemi-β,β-dimethylglutarate.

The term "oxyether," as used herein, denotes those ether groups conventionally employed in the art, preferably those derived from straight chain, branched chain, aromatic hydrocarbons and oxo heterocyclic hydrocarbons. The term "hydrocarbon" defines both saturated and unsaturated hydrocarbons. Those designated hydrocarbons are optionally substituted with groups such as hydroxy, alkoxy, halo, alkylthio, and the like. Preferably the hydrocarbons contain from one to twelve carbon atoms. Typical oxyethers thus include alkoxy, difluoromethoxy, alkoxymethyloxy, tetrahydrofuran-2′-yloxy, tetrahydropyran-2′-yloxy and 4′-alkoxytetrahydropyran-4′-yloxy.

The term "thioether," as used herein, denotes those thio ether groups conventionally employed in the art, preferably those derived from straight chain, branched chain, cyclic and aromatic hydrocarbons. The term "hydrocarbon" defines both saturated and unsaturated hydrocarbons. These hydrocarbons are optionally substituted with groups such as hydroxy, alkoxy, alkylthio, halo, and the like. Preferably the hydrocarbons contain from one to twelve carbon atoms. Typical thioethers thus include alkylthio, difluoromethylthio, alkoxymethylthio, and the like.

When one of $R^1$ and $R^2$ is hydrogen and the other is methyl, ethyl or difluoromethyl, the compounds of Formulas I, II and III can exist as pairs of enantiomorphs. Each of the optical isomers of the present naphthyl oxygeneated alkyls is included within the present invention.

In some instances, one enantiomorph exhibits greater anti-inflammatory, analgesic, anti-pyretic and/or anti-pruritic activity than the other enantiomorph. For example, the levorotatory form, the 1 or (−) form, of β-(6-methoxy - 2 - naphthyl) - β - methylethanol exhibits greater anti-inflammatory activity than the corresponding dextrorotatory form.

The present naphthyl oxygenated alkyls that exist as enantiomorphs can be administered as mixtures of enantiomorphs or as resolved enantiomorphs.

The enantiomorphs are resolved by conventional means, such as by (a) selective biological degradation; or (b) by the preparation of carboxy derivatives of the compounds of Formulas I, II or III, then the preparation of diastereo-isomer salts thereof with an alkaloid, such as cinchonidine, then the separation of the diastereo-isomer salts by fractional crystallization and finally the regeneration of the optically resolved isomers of the compounds of Formulas I, II or III from their respective resolved diastereo-isomer salts.

Alternatively, and preferably, the resolved compounds of Formulas I, II and III can be prepared from the corresponding resolved starting compounds used to prepare the compounds of Formulas I, II and III. The resolved compounds of Formulas I–III and their respective resolved starting compounds will not necessarily have the same optical rotation although they will have the same absolute configuration. For example, 1 β - (6 - methoxy - 2-naphthyl)-β-methylethanol is prepared from d 6-methoxy-2-naphthyl-α-methyl acetic acid.

The compounds of Formulas I, II and III exhibit anti-inflammatory, analgesic, anti-pyretic and anti-pruritic activity in mammals.

These compounds are useful in the treatment of inflammation of the skin, respiratory tract, musculo-skeletal system, joints, internal organs and tissues. Accordingly, these compounds are useful in the tretament of conditions characterized by inflammation, such as contact dermatitis, allergic conditions, burns, rheumatism, contusion, arthritis, bone fracture, post-traumatic conditions and gout. In those cases in which the above conditions include pain, pyrexia, and pruritus, coupled with the inflammation, the instant compounds are useful for relief of these conditions as well as the inflammation. For example, the instant compounds are useful in the treatment of pain associated with post-operative conditions, post-traumatic conditions, post-partum conditions, dysmenorrhea, burns, gout, contusions, neuralgia, neuritis, headaches and rheumatic fever. As stated above, these compounds also exhibit anti-pyretic activity, accordingly, these compounds are useful in the treatment of pyrexia where reduction of a fever is indicated, for example, cases where high fever is associated with diseases such as rheumatic fever, bronchitis, pneumonia, typhoid fever, Hodgkin's disease, and the like. The present compounds are also useful in the treatment of pruritus where the condition exists contemporaneously with inflammation, pain and/or high fever. Moreover, the compounds are useful for treating pruritus per se.

The preferred manner of oral administration provides the use of a convenient daily dosage regimen which can be adjusted according to the degree of affliction. Generally, a daily dose of from 0.01 mg. to 20 mg. of the compound of Formulas I, II or III per kilogram of body weight of the mammal is employed. Most conditions respond to treatment comprising a dosage level in the order of .5 mg. to 5 mg. per kilogram of body weight per day. For such oral administration, a pharmaceutically acceptable non-toxic composition is formed by the incorporation of any of the normally employed excipients. Suitable pharmaceutically acceptable carriers or excipients include starch, glucose, lactose, gelatin, malt, flour, chalk, magnesium carbonate, magnesium stearate, glyceryl, monostearate, talc, dried skim milk, glycerol, water, ethanol, and the like. These compositions take the form of solutions, suspensions, tablets, pills, capsules, powders, sustained release formulations, and the like. In addition, these compounds can be administered in conjunction with other medicinal agents depending upon the specific condition being treated.

These compounds generally exhibit greater anti-inflammatory, analgesic, anti-pyretic and anti-pruritic activity than the conventional anti-inflammatory, analgesic, anti-pyretic and anti-pruritic compounds known to the art. For example, measure of anti-inflammatory activity according to the carregeenin induced edema assay of Winter et al., Proceedings of the Society for Experimental Biology and Medicin 111, 544 (1962) shows β-(6-methoxy-2-naphthyl)-ethanol and 1 β-(6-methoxy-2-naphthyl)-β-methylethanol to have four times and greater than 7 times the activity of phenylbutazone, respectively. Similar standard assays to measure analgesic and anti-pyretic activities show β - (6 - methoxy - 2 - naphthyl) - β - methylethanol to have three times and eight times the activity of aspirin in these two respective categories.

The compounds of Formulas I, II and III include the novel compounds of the following formulas:

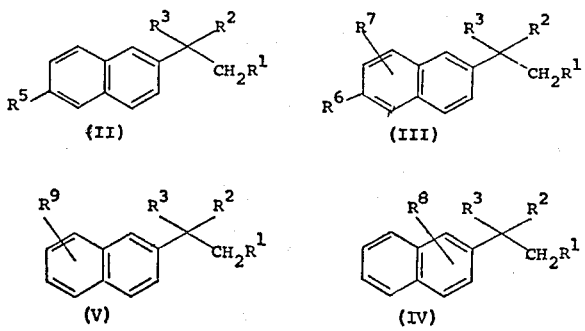

wherein, $R^1$ is hydroxy, tetrahydrofuran-2'-yloxy, tetrahydropyran-2'-yloxy, 4'-alkoxytetrahydropyran-4'-yloxy or a conventional hydrolyzable ester;

One of $R^2$ and $R^3$ is hydrogen, the other is hydrogen, methyl, ethyl or difluoromethyl; or $R^2$ and $R^3$ taken together are methylene, halomethylene or ethylene;

$R^5$ is alkyl, cycloalkyl, hydroxymethyl, alkoxymethyl, trifluoromethyl, vinyl, ethynyl, fluoro, chloro, hydroxy, a conventional hydrolyzable ester, oxyether, thioether, formyl, acetyl or aryl;

Each of $R^6$ and $R^7$ (at position C–1, 4, 5, 7 or 8) is alkyl, fluoro, chloro, hydroxy, a conventional hydrolyzable ester, oxyether, or thioether, provided that when one of $R^6$ and $R^7$ is hydroxy, oxyether or thioether, the other is the identical group or alkyl, fluoro, chloro, or a conventional hydrolyzable ester;

$R^8$ (at position C–1, 4 or 8) is hydrogen, trifluoromethyl, fluoro, chloro, hydroxy, a conventional hydrolyzable ester, oxyether or thioether, provided that $R^8$ is trifluoromethyl, fluoro, chloro, hydroxy, a conventional hydrolyzable ester, oxyether or thioether, when both $R^2$ or $R^3$ are hydrogen; and $R^9$ (at position C–5 or 7) is alkyl, trifluoromethyl, fluoro, chloro, hydroxy, a conventional hydrolyzable ester, oxyether or thioether.

In the preferred embodiment of the invention, the compounds of Formulas I, II and III used in the novel methods of treating inflammation, pain, pyrexia and pruritus, and the compounds of Formulas I, II and III used in the present novel compositions, and the novel compounds of Formulas II, III, IV and V are those compounds wherein, $R^1$ is hydroxy, acetoxy, propionyloxy, butryloxy, valeryloxy, capryloxy, bicyclo[2.2.2] octyl carboxy, adamantoyloxy, tetrahydrofuran - 2' - yloxy, tetrahydropyran-2'-yloxy, or 4'-methoxytetrahydropyran-4'-yloxy;

One of $R^2$ and $R^3$ is hydrogen, the other is hydrogen, methyl, ethyl or difluoromethyl; or $R^2$ and $R^3$ taken together are methylene or difluoromethylene;

$R^4$ (at position C-1, 4, 5, 7 or 8) is hydrogen, methyl, ethyl, isopropyl, trifluoromethyl, fluoro, chloro, methoxy, methoxymethyloxy, difluoromethoxy, 4' - methoxytetrahydropyran-4'-yloxy, methylthio, methoxymethylthio or difluoromethylthio;

$R^5$ is methyl, ethyl, isopropyl, cyclopropyl, trifluoromethyl, vinyl, ethynyl, fluoro, chloro, methoxy, methoxymethyloxy, difluoromethoxy, 4'-methoxytetrahydropyran-4'-yloxy, methylthio, methoxymethylthio or difluoromethylthio;

Each of $R^6$ and $R^7$ (at position C-1, 4, 5, 7 or 8) is methyl, ethyl, isopropyl, fluoro, chloro, methoxy, methoxymethyloxy, difluoromethoxy, 4' - methoxytetrahydropyran-4'-yloxy, methylthio, methoxymethylthio or difluoromethylthio, provided that when one of $R^6$ and $R^7$ is methoxy, methoxymethyloxy, difluoromethoxy, 4'-methoxytetrahydropyran-4'-yloxy, methylthio, methoxymethylthio or difluoromethylthio, the other is the identical group or methyl, ethyl, isopropyl, fluoro or chloro;

$R^8$ is hydrogen, trifluoromethyl, fluoro, chloro, methoxy, methoxymethyloxy, difluoromethoxy, 4'-methoxytetrahydropyran-4'-yloxy, methylthio, methoxymethylthio or difluoromethylthio; and $R^9$ (at position C-5 or 7) is methyl, ethyl, isopropyl, trifluoromethyl, fluoro, chloro, methoxy, methoxymethyloxy, difluoromethoxy, 4'-methoxytetrahydropyran-4'-yloxy, methylthio, methoxymethylthio or difluoromethylthio.

An especially preferred group of naphthyl alkanols and derivatives thereof are those of Formulas II and V in which $R^1$, $R^2$, $R^3$, $R^5$ and $R^9$ are as defined in the above immediate paragraph.

The present compounds of Formulas I, II and III are prepared from the corresponding 2-naphthyl acetic acid derivatives or esters thereof via a novel process which can be illustrated by the following reaction scheme A:

Scheme A

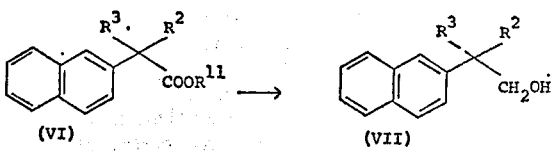

in which, $R^2$ and $R^3$ are as defined above and $R^{11}$ is hydrogen or alkyl. In the above scheme, the naphthyl moiety of the compounds of Formula VI, naphthyl acetic acid derivatives and esters thereof, and the naphthyl moiety of the compounds of Formula VII, β-[2-naphthyl] ethanol derivatives, can be substituted with an $R^3$ group at position C-1, 4, 5, 7 or 8; or an $R^4$ group at position C-6; or an $R^5$ group at position C-6 and an $R^6$ group at position C-1, 4, 5, 7 or 8.

The novel process of Scheme A is conducted by treating the compound of Formula VI with lithium aluminum hydride. If the free carboxylic acid form of the compound of Formula VI (wherein $R^{11}$ is hydrogen) is used as a starting material, at least 0.75 molar equivalents of lithium aluminum hydride are used, and preferably about 1.0 to 2.5 molar equivalents are used. If the ester form of the compound of Formula VI (wherein $R^{11}$ is alkyl) is used as a starting material, at least 0.5 molar equivalents of lithium aluminum hydride are used, and preferably about 0.6 to 2.0 molar equivalents are used. The novel process is carried out in an inert organic ether, such as diethyl ether, dipropyl ether diisopropyl ether, dibutyl ether, tetrahydrofuran, or the like, The reaction is carried out at a temperature between 0° C. and the boiling point of the solvent employed, preferably between 15° C. to 35° C.

The compound of Formula VII is isolated by destroying the excess lithium aluminum hydride, if any, such as by the addition of excess ethyl acetate, or aqueous solutions of sodium hydroxide or ammonium chloride. The mixture is then diluted with water, filtered and extracted with an inert organic solvent immiscible with water. The compound of Formula VII can be further purified by standard techniques, such as crystallization, chromatography, etc.

Alternatively, the compounds of Formula VI can be reduced by treating them with diborane in tetrahydrofuran at a temperature between about 0° C. and about 65° C.

Certain groups present on the starting compound of Formula VI are reduced by lithium aluminum hydride or diborane. For example, an acetyl group is reduced to an α-hydroxy ethyl group and a formyl group is reduced to a hydroxy methyl group. These reduced groups are regenerated after the completion of the above novel process via an oxidation process using manganese dioxide (active) in an inert organic solvent, such as acetone, petroleum ether, and the like, at about room temperature.

The compounds of Formula VII can be esterified or etherified via conventional techniques. For example, the compounds can be esterified by treatment with an acid anhydride, such as acetic anhydride, valeric anhydride, caproic anhydride, and the like, in pyridine; or by treatment with an acid chloride, such as acetyl chloride, adamantoyl chloride, and the like, in pyridine; or by treatment with a carboxylic acid in the presence of an acid catalyst, such as p-toluene-sulfonic acid, and the like. The compounds of Formula VII can be etherified by treatment with an alkali metal hydride, such as sodium hydride, and an organic halide, such as cyclopentyl chloride, 2 - chlorotetrahydropyran, 2 - chlorotetrahydrofuran, and the like; or by treatment with dihydrofuran, dihydropyran, 4'-methoxydihydropyran, and the like, in the presence of an acid catalyst; or by treatment with an alkoxymethyl halide, such as methoxymethyl chloride, in dimethylformamide or dimethylacetamide.

When a resolved enantiomorph of Formula VI is employed as starting material in the above process, the corresponding resolved enantiomorph of Formula VII is obtained. As stated above, although the absolute configuration of the 2-naphthyl acetic acid starting compound and the corresponding β-[2-naphthyl] ethanol product will be identical, the optical rotation of the starting compound and product will not necessarily be the same.

The compounds of Formula VI, and the 2-naphthyl acetic acid starting materials, can be prepared by any one of several methods fully described in our copending U.S. application No. 608,997, filed Jan. 13, 1967 and now abandoned; No. 694,771, filed Dec. 7, 1967 and No. 741,-858, filed July 2, 1968 (PA-325, "5-Substituted-2-Naphthyl Acetic Acid Derivatives, and Compositions and Methods of Use Thereof," filed of even date herewith). One method is to treat a tetralone, optionally substituted at position C-5, 6, 7 or 8 or disubstituted at positions C-6 and C-5, 7 or 8, sequentially with (1) an alkyl carbonate and an alkali metal hydride, (2) an anlkali metal hydride and an α-halo acetic acid and (3) aqueous mineral acid to obtain the corresponding 2-(carboxymethyl)-1-tetralone. The latter is reduced with sodium borohydride to form the corresponding 1,2,3,4-tetrahydro-1-hydroxy-2-naphthyl acetic acid; this resulting product is hydrogenolyzed with hydrogen in the presence of a hydrogenation catalyst; the resulting product is esterified and then dehydrogenated with palladium charcoal catalyst at about 180° C. to furnish the corresponding 2-naphthyl acetic acid ester derivative.

The compounds of Formula VI that are substituted at position C-1 or disubstituted positions C-1, 6 are prepared from the corresponding 2-(carboxymethyl)-1-tetralones by treating the latter (1) with a phosphorous pentahalide to halogenate at the C-1 position or; (2) with alkyl magnesium bromide and then with aqueous mineral acid to alkylate at the C–1 position; or (3) with trialkyl orthoformate in the presence of an acid catalyst to add an alkoxy group at position C–1; and then dehydrogenating the resulting halogenated or alkylated or alkoxylated product by refluxing with 2,3-dichloro-5,6-dicyano-1,4-benzoquinone.

The compounds of Formula VI substituted at position C–4 or disubstituted at positions C–4 and 6 are prepared from unsubstituted and 6-substituted 3-(carboxymethyl) tetralones respectively via the processes used to prepare 1-substituted-2-naphthyl acetic acids from 2-(carboxymethyl)tetralones; 3-(carboxymethyl) tetralones are prepared via the process described in J. Chem. Soc. (London) 1922, 1717.

The compounds of Formula VI substituted at the α-position are prepared from the corresponding α-unsubstituted compounds of Formula VI by esterifying the latter, and treating it with ethyl formate and sodium metal to obtain the corresponding α,α-hydroxymethylene derivative. The latter is treated with sodium hydride, then with chlorine gas, then with chromium trioxide in acetic acid and then heated to yield the corresponding α-chloro derivative. The α-chloro derivative is refluxed in sodium hydroxide, esterified with diazomethane, oxidized with chromium trioxide in acetic acid and coupled by refluxing with difluoromethylene triphenyl phosphorane in benzene to obtain the corresponding α,α-difluoromethylene derivatives.

The α-methyl substituents are added to the α-unsubstituted compounds of Formula VI by esterifying the latter, and treating it with sodium hydride and alkyl halide, such as methyl iodide. The α-difluoromethyl substituent is added by treating the α-unsubstituted compounds of Formula VI successively with sodium hydride and diethyl carbonate, then with chlorodifluoromethane, then with aqueous 5% sodium hydroxide at 75° C. and then finally heating the resulting product to about 150° C. to yield the corresponding α-difluoromethyl derivatives of Formula VI.

The α,α-methylene substituents are introduced by treating the α-unsubstituted compounds of Formula VI with formaldehyde and an alkali metal hydroxide. The α,α-ethylene substituents are introduced by refluxing the corresponding α,α-methylene derivative of Formula VI with diiodomethane in the presence of zinc-copper couple.

The compounds of Formula VI that exist as pairs of enantiomorphs can be resolved by preparing the alkaloid base salts of the latter, resolving the resulting diastereoisomer salts by fractional crystallization, and cleaving the resolved salts. The optical rotation of a particular enantiomorph is determined by polarimetry.

The following examples are included to further illustrate the present invention and are not intended as a limitation of the above described invention.

EXAMPLE 1

To a mixture of 0.4 g. of lithium aluminum hydride and 100 ml. of ethyl ether, there is added a mixture of 2.3 g. of a d 6-methoxy-2-naphthyl-α-methyl acetic acid and 100 ml. of ethyl ether. The mixture is stirred at 0° C. for 30 minutes, then 10 ml. of ethyl acetate are added; one hour later 4 ml. of water are added. The resulting mixture is filtered and evaporated under reduced pressure to yield 1 β-(6-methoxy-2-naphthyl)-β-methylethanol.

Similarly,

β-(1-methoxy-2-naphthyl) ethanol,
β-(4-difluoromethylthio-2-naphthyl)-β-methylethanol,
β-(5-methylthio-2-naphthyl)-β-methylethanol,
β-(5-chloro-2-naphthyl) ethanol,
β-(5-trifluoromethyl-2-naphthyl)-β,β-difluoromethyleneethanol,
β-(6-fluoro-2-naphthyl)-β-methylethanol,
β-(6-methyl-2-naphthyl) ethanol,
β-(6-methoxy-2-naphthyl) ethanol,
β-(6-difluoromethoxy-2-naphthyl)-β-difluoromethylethanol,
β-(6-methoxy-2-naphthyl)-β-ethylethanol,
β-(6-chloro-2-naphthyl)-β-methylethanol,
β-(7-methoxy-2-naphthyl)-β-methylethanol,
β-(7-methylthio-2-naphthyl)-β-ethylethanol,
β-(7-chloro-2-naphthyl)-β,β-methyleneethanol,
β-(8-trifluoromethyl-2-naphthyl)-β,β-methyleneethanol, and
β-(5,6-dimethyl-2-naphthyl)-β-methylethanol are prepared from 1-methoxy-2-naphthyl acetic acid,
4-difluoromethylthio-2-naphthyl-α-methyl acetic acid,
5-methylthio-2-naphthyl-α-methyl acetic acid,
5-chloro-2-naphthyl acetic acid,
5-trifluoromethyl-2-naphthyl-α,α-difluoromethylene acetic acid,
6-fluoro-2-naphthyl-α-methyl acetic acid,
6-methyl-2-naphthyl acetic acid,
6-methoxy-2-naphthyl acetic acid,
6-difluoromethoxy-2-naphthyl-α-difluoromethyl acetic acid,
6-methoxy-2-naphthyl-α-ethyl acetic acid,
6-chloro-2-naphthyl-α-methyl acetic acid,
7-methoxy-2-naphthyl-α-methyl acetic acid,
7-methylthio-2-naphthyl-α-ethyl acetic acid,
7-chloro-2-naphthyl-α,α-methylene acetic acid,
8-trifluoromethyl-2-naphthyl-α,α-methylene acetic acid, and
5,6-dimethyl-2-naphthyl-α-methyl acetic acid, respectively, by means of the above process.

EXAMPLE 2

A mixture of 230 g. of 5-methoxy-2-naphthyl-α-methyl acetic acid, 57 g. of lithium aluminum hydride and 10 liters of tetrahydrofuran is stirred for two hours at 0° C., then 1 liter of ethyl acetate is added. One hour after, 500 ml. of water are added to the resulting mixture, the mixture is stirred, filtered and evaporated under vacuum to yield β-(5-methoxy-2-naphthyl)-β-methylethanol.

Similarly,

β-(5-methyl-2-naphthyl)-β-methylethanol,
β-(5-fluoro-2-naphthyl)-β-ethylethanol,
β-(5-methoxy-2-naphthyl) ethanol,
β-(6-methyl-2-naphthyl)-β-methylethanol,
β-(6-chloro-2-naphthyl)-β-difluoromethylethanol,
β-(6-methylthio-2-naphthyl)-β,β-methyleneethanol,
β-(6-trifluoromethyl-2-naphthyl)-β-methylethanol,
β-(7-methyl-2-naphthyl)-β-methylethanol,
β-(7-fluoro-2-naphthyl) ethanol,
β-(7-trifluoromethyl-2-naphthyl)-β-methylethanol,
β-(1-chloro-2-naphthyl)-β-ethylethanol,
β-(4-ethoxy-2-naphthyl)-β,β-ethyleneethanol,
β-(6,7-dimethoxy-2-naphthyl)-β-methylethanol, and
β-(8-hydroxy-2-naphthyl)-β-ethylethanol are prepared from 5-methyl-2-naphthyl-α-methyl acetic acid,
5-fluoro-2-naphthyl-α-ethyl acetic acid,
5-methylthio-2-naphthyl acetic acid,
6-methyl-2-naphthyl-α-methyl acetic acid,
6-chloro-2-naphthyl-α-difluoromethyl acetic acid,
6-methylthio-2-naphthyl-α,α-methylene acetic acid,
6-trifluoromethyl-2-naphthyl-α-methyl acetic acid,
7-methyl-2-naphthyl-α-methyl acetic acid,
7-fluoro-2-naphthyl acetic acid,
7-trifluoromethyl-2-naphthyl-α-methyl acetic acid,
1-chloro-2-naphthyl-α-ethyl acetic acid,
4-ethoxy-2-naphthyl-α,α-ethylene acetic acid,
6,7-dimethoxy-2-naphthyl-α-methyl acetic acid, and
8-hydroxy-2-naphthyl-α-ethyl acetic acid, respectively, via the above process.

EXAMPLE 3

A mixture of 46 g. of 6-methoxy-2-naphthyl-α-methyl acetic acid, 6 g. of diborane and 220 ml. of tetrahydrofuran are stirred for eight hours at room temperature (about 23° C.). The mixture is allowed to stand for one hour after being diluted with 50 ml. of aqueous acetone, then 300 ml. of diethyl ether are added. The resulting mixture is washed with water, dried over sodium sulfate and evaporated to yield β-(6-methoxy-2-naphthyl)-β-methylethanol.

Similarly,

β-(1-trifluoromethyl-2-naphthyl)-β,β-ethyleneethanol,
β-(4-acetoxy-2-naphthyl)-β,β-difluoromethyleneethanol,
β-(5-methoxymethyloxy-2-naphthyl)-β-ethylethanol,
β-(5-isopropyl-2-naphthyl) ethanol,
β-(6-vinyl-2-naphthyl)-β-methylethanol,
β-(6-acetyl-2-naphthyl) ethanol,
β-(7-acetoxy-2-naphthyl)-β-difluoromethylethanol,
β-(7-ethyl-2-naphthyl)-β-ethylethanol,
β-[8-(4'-methoxytetrahydropyran-4'-yloxy)-2-naphthyl]-β-methylethanol, and
β-(6,7-dimethyl-2-naphthyl)-β-methylethanol are prepared from the corresponding substituted 2-naphthyl acetic acids.

EXAMPLE 4

To a solution of 1 g. of β-(6-methylthio-2-naphthyl)-β-methylethanol in 20 ml. of benzene, 20 ml. of dihydrofuran is added. Five milliliters is distilled off to remove moisture, and the mixture is allowed to cool to room temperature. To the cooled mixture, 0.2 g. of p-toluenesulfonyl chloride is added. The mixture is stirred at room temperature for 24 hours and is then poured into an excess of 5% aqueous sodium bicarbonate solution. The product is extracted with ethyl acetate, the organic solution is washed with water to neutrality, dried over anhydrous magnesium sulfate, and evaporated to dryness under reduced pressure. The oily residue crystallizes on the addition of ether to yield the tetrahydrofuran-2'-yl- ether of β-(6-methylthio-2-naphthyl)-β-methylethanol.

Similarly, the tetrahydropyran-2'-yl ether of β-(6-methylthio-2-naphthyl)-β-methylethanol and the 4'-methoxytetrahydropyran-2'-yl ether of β-(6-methylthio-2-naphthyl)-β-methylethanol are prepared via the above procedure by using dihydropyran and 4-methoxydihydropyran, respectively, in place of dihydrofuran.

EXAMPLE 5

A mixture of 1 g. of β-(7-methylthio-2-naphthyl)-β-methylethanol, 4 ml. of pyridine and 2 ml. of acetic anhydride is allowed to stand at room temperature for 15 hours. The mixture is then poured into ice water and the solid which forms is collected by filtration, washed with water and dried to yield the acetate ester of β-(7-methylthio-2-naphthyl)-β-methylethanol which may be further purified by recrystallization from acetone:hexane.

The corresponding propionate, valerate, and caproate esters are prepared by means of the above process by using propionic anhydride; valeric anhydride, and caproic anhydride, respectively, in place of acetic anhydride in the above process.

EXAMPLE 6

A mixture of 2 g. of β-(5-trifluoromethyl-2-naphthyl)-α-methylethanol in 8 ml. of pyridine and 4 ml. of adamantoyl chloride is heated at steam bath temperatures for one hour. The mixture is then poured into ice water and the solid which forms is collected by filtration, washed successively with sodium bicarbonate solution and with water and dried to yield the adamantate ester of β-(5-trifluoromethyl-2-naphthyl)-α-methylethanol which is further purified through recrystallization from methylene chloride: hexane.

EXAMPLE 7

A mixture of 21 g. of β-(6-methoxy-2-naphthyl)-β,β-methyleneethanol, 50 g. of borontribromide and 250 ml. of methylene dichloride is prepared at —80° C. and allowed to come to room temperature. The mixture is then diluted with 500 ml. of water and extracted with methylene chloride. The combined extracts are washed with water to neutrality, dried over magnesium sulfate and evaporated to yield β-(6-hydroxy-2-naphthyl)-β,β-methylene ethanol.

EXAMPLE 8

Step A.—A mixture of 22 g. of β-methoxy-2-naphthyl)-β-methylethanol, 30 g. of phthalic anhydride and 500 ml. of pyridine is stirred for six hours at room temperature. The resulting mixture is then diluted with water and extracted with methylene chloride. The combined extracts are washed with water, aqueous .1 N hydrochloric acid and with water to neutrality, dried over sodium sulfate and evaporated to yield mono [β-(6-methoxy - 2 - naphthyl)-β-methylethyl] phthalate.

Step B.—A mixture of 36 g. of mono [β-(6-methoxy-2-naphthyl)-β-methylethyl] phthalate, 29 g. of cinchonidine, and 500 ml. of methanol is stirred for two hours; the mixture is then allowed to stand until crystallization is complete. The crystals are filtered off and washed with methanol (the filtrate and washings are collected). The crystals are recrystallized from methanol, filtered, washed and dried. The pure crystals are added to 600 ml. of 0.2 N hydrochloric acid. The resulting mixture is stirred for two hours and then extracted with diethyl ether. The extracts are combined, washed with water to neutrality, dried over sodium sulfate and evaporated.

Step C.—The resulting residue of Step B is added to a mixture of 5 g. of sodium hydroxide, 250 ml. of water and 250 ml. of tetrahydrofuran. After the resulting mixture has stood for two hours at 23° C., the mixture is extracted with methylene chloride. The combined extracts are washed with aqueous acid and then with water to neutrality, dried over sodium sulfate and evaporated to yield one of the optical isomers of β-(6-methoxy-2-naphthyl)-β-methylethanol. The optical rotation of the isomer is determined by polarimetry.

The combined filtrates and washings of Step B are evaporated. This residue is treated as the residue in Step C to yield the other optical isomer of β-(6-methoxy-2-naphthyl-β-methylethanol.

EXAMPLE 9

The anti-inflammatory activity of β-(6-methoxy-2-naphthyl)-β-methylethanol was compared with that of phenylbutazone by means of a carageenin-induced rat paw inflammation test described by C. A. Winter et al., Proceedings in Experimental Biology & Medicine 111, 544–47 (1962).

The test was modified in that female rats weighing 80–90 grams were employed and the degree of inflammation was measured in units of rear paw weight rather than rear paw volume. The results are shown in the following table.

| Compound | β-(6-methoxy-2-naphthyl)-β-methylethanol. |
|---|---|
| No. of rats | 34. |
| Dose range tested mg./rat | 0.1–0.9 |
| Relative potency to phenylbutazone (phenylbutazone =1) | 7. |

EXAMPLE 10

The anti-pyretic activity of β-(6-methoxy-2-naphthyl)-β-methylethanol was compared to the antipyretic activity of aspirin.

Anti-pyretic activity.—Female rats weighing 90–100 grams were used. The "normal" rectal temperature of the rats was recorded at hour 0, followed by the injection of 2 ml. of a yeast suspension (the yeast suspension is prepared by suspending one cake of Fleischman's yeast in 22 ml. of 0.9% NaCl) subcutaneously (1 ml. dorsally, 1 ml. ventrally). The injection sites are massaged to spread the suspension beneath the skin. The yeast injection induces elevated body temperature. At hour 17, the rats were massaged again to stimulate a further increase in body temperature. (It was found that handling the rats at the time the second temperature was taken resulted in a rise in body temperature.) At hour 18, the second rectal temperature was recorded, after which the test material was administered orally by gavage in 1 ml. aqueous vehicle. (The aqueous vehicle consists of 0.9% NaCl, 0.4% polysorbate 80, 0.5% carboxymethyl cellulose, 0.9% benzyl alcohol and water.) The third rectal temperature was obtained two hours after administration of the test material.

The degree of anti-pyretic activity was measured as a reduction in temperature (° F.) from the second to the third temperature readings (temperature at hour 18— temperature at hour 20) with respect to a control. The results are shown in the following table.

Compound _____ β-(6-methoxy-2-naphthyl)-β-methylethanol.
No. of rats _____ 15.
Dose range tested mg./rat __ 0.4–3.0
Relative potency to aspirin (aspirin=1) _____ 8.

EXAMPLE 11

Ingredients: Quantity per tablet, mgs.
β-(7-methyl-2-naphthyl)-β-methylethanol _____ 10
Cornstarch _____ 240

The above ingredients are thoroughly mixed and processed into single scored tablets, one tablet being administered every three to four hours.

EXAMPLE 12

Ingredients: Quantity per tablet, mgs.
1 β-(6-methoxy-2-naphthyl)-β-methylethanol ____ 30
Cornstarch _____ 100
Lactose _____ 370
Magnesium stearate _____ 2

The above ingredients are mixed intimately and pressed into single scored tablets.

EXAMPLE 13

Ingredients: Quantity per capsule, mgs.
β-(5-methoxy-2-naphthyl)-β-methylethanol ____ 2.5
Lactose _____ 247.5

The above ingredients are mixed and introduced into a No. 1 hard-shell gelatin capsule.

What is claimed is:
1. A compound selected from the group of compounds represented by the formula:

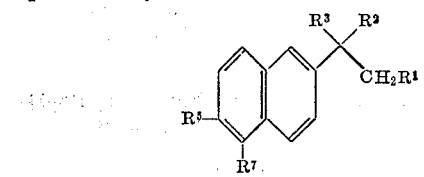

wherein
$R^1$ is hydroxy;
one of $R^2$ and $R^3$ is hydrogen and the other is methyl, ethyl or difluoromethyl, or $R^2$ and $R^3$ taken together are methylene, halomethylene or ethylene;
$R^5$ is alkyl having up to 6 carbons, cycloalkyl having from 3 to 7 carbons, alkoxymethyl having up to 7 carbons, trifluoromethyl, vinyl, ethynyl, fluoro, chloro, hydroxy, alkoxy having up to 12 carbons, difluoromethoxy, alkoxymethyloxy having up to 12 carbons, alkylthiomethyloxy having up to 12 carbons, alkylthio having up to 12 carbons, difluoromethylthio, alkoxymethylthio having up to 12 carbons, alkylthiomethylthio having up to 12 carbons, phenyl or alkyl substituted phenyl having up to 8 carbons; and
$R^7$ is hydrogen, fluoro or chloro.

2. A compound of claim 1 wherein $R^7$ is hydrogen.
3. A compound of claim 2 wherein one of $R^2$ and $R^3$ is hydrogen and the other is methyl.
4. A compound of claim 3 wherein $R^5$ is alkyl having up to 4 carbons, cyclopropyl, phenyl, fluoro, chloro, alkoxy having up to 3 carbons, difluoromethoxy, methoxymethyloxy, alkylthio having up to 3 carbons, methoxymethylthio, difluoromethylthio or trifluoromethyl.
5. A compound of claim 3 wherein $R^5$ is methyl.
6. A compound of claim 3 wherein $R^5$ is ethyl.
7. A compound of claim 3 wherein $R^5$ is methoxy.
8. As a compound of claim 7, 1 β-(6-methoxy-2-naphthyl)-β-methylethanol.
9. A compound of claim 3 wherein $R^5$ is fluoro.
10. A compound of claim 3 wherein $R^5$ is chloro.
11. A compound of claim 3 wherein $R^5$ is methylthio.
12. A compound of claim 3 wherein $R^5$ is difluoromethoxy.
13. A compound of claim 3 wherein $R^5$ is difluoromethylthio.
14. A compound of claim 3 wherein $R^5$ is trifluoromethyl.
15. A compound of claim 3 wherein $R^5$ is phenyl.

References Cited

UNITED STATES PATENTS 2,542,937   2/1951   Miescher et al. ____ 260—613 D
3,223,621  12/1965   Marlowe et al. ____ 260—619 F

OTHER REFERENCES

Elsevier's Encyclopedia of Organic Chemistry, Series III, vol. 12B (1950), pp. 1936, 1937, 1939, 1940.

Guss, Jour. Amer. Chem. Soc., vol. 73, pp. 608–611.

Meadow et al., Jour. Chem. Soc., (London) (1954), pp. 1161–1162.

BERNARD HELFIN, Primary Examiner

U.S. Cl. X.R.

424—283, 285, 311, 331, 333, 337, 341, 343; 260—618 F, 619 F, 613 R, 621 K, 611 A, 609 F, 609 E, 345.2, 345.8, 345.9, 346.2, 347.2, 347.4, 488 CD, 592, 599